United States Patent
Seifert et al.

[15] 3,671,663
[45] June 20, 1972

[54] CONDUCTIVE THERMOPLASTIC COMPOSITION USEFUL FOR HIGH TENSION CABLES

[72] Inventors: Friedrich Seifert, Marl; Josef Bittscheidt, Datteln, both of Germany

[73] Assignee: Chemische Werke Huels, A.G., Marl, Germany

[22] Filed: March 25, 1970

[21] Appl. No.: 22,672

[30] Foreign Application Priority Data

March 25, 1969 Germany .................P 19 15 061.9

[52] U.S. Cl.............174/120 SC, 174/102 SC, 174/110 AR, 174/110 PM, 252/511
[51] Int. Cl. ..........................................H01b 7/02
[58] Field of Search ......174/110 R, 110 PM, 110 B, 110 AR, 174/120 SC, 120 R, 102 SC, 105 SC, 106 SC; 252/511

[56] References Cited

UNITED STATES PATENTS

| | | | |
|---|---|---|---|
| 3,096,210 | 7/1963 | Boonstra | 174/110 PM |
| 3,517,086 | 6/1970 | Shirayama et al. | 174/110 PM |
| 2,597,741 | 5/1952 | Macey | 252/511 UX |
| 2,830,919 | 4/1958 | Schatzel | 174/110 PM |
| 2,512,459 | 6/1950 | Hamilton | 174/110 PM |

FOREIGN PATENTS OR APPLICATIONS

| | | | |
|---|---|---|---|
| 508,338 | 12/1954 | Canada | 174/110 PM |
| 842,479 | 7/1960 | Great Britain | 174/110 B |

Primary Examiner—Lewis H. Myers
Assistant Examiner—A. T. Grimley
Attorney—Millen, Raptes & White

[57] ABSTRACT

The invention relates to electrically conductive thermoplastic compositions suitable for use as intermediate layers in high tension cables having an outer insulating layer comprising poly (butene-1). The composition comprises stated amounts of isotactic poly (butene-1), amorphous and/or atactic thermoplastic compositions, and an electrically conductive carbon black.

11 Claims, No Drawings

CONDUCTIVE THERMOPLASTIC COMPOSITION USEFUL FOR HIGH TENSION CABLES

BACKGROUND OF THE INVENTION

This invention relates to a electrically conductive, synthetic thermoplastic, carbon black containing composition useful in the production of electrical cables.

It is known in the art to produce electrically conductive thermoplastic compositions from specific ethylene copolymers, particularly ethylene-acrylate resins, and so-called conductive carbon blacks (Polymer Engineering and Science, Volume 7, pp. 63–70, 1967). The conductive compositions are desirably used to form an intermediate layer between the metallic internal conductor and the outer insulation of a high tension cable. The intermediate layer prevents voltage peaks and glow discharges on the boundry surfaces. The conductive thermoplastic compositions heretofore known, i.e. ethylene copolymers, are not particularly satisfactory for use, due to their tendencies to form stress cracks under current and bearing loads.

It is desirable in the production of high tension cables to use an outer insulation material which has the characteristic of particularly high stress-cracking resistance. A particularly suitable material is a crystalline poly (butene-1), i.e. isotactic poly (butene-1). Heretofore, the use of an outer insulating material having high stress-cracking resistance, isotactic poly (butene-1), with the heretofore used electrically conductive, thermoplastic compositions as intermediate layers in cables, created an additional problem which interfered with the proper functioning of the cable. The two materials could not be satisfactorily fused or welded together at their interface.

The desirability of using crystalline poly(butene-1), as an external insulation in high tension cables was accordingly limited by the unavailability heretofore of a suitable intermediate conductive thermoplastic composition which would have the desired electrical and mechanical properties and which could be fused or welded to the external insulation. In particular, it would be desirable to use an intermediate layer conductive material having substantially the same properties as crystalline poly(butene-1) but having a specific insulation resistance less than 1,000 ohm-cm. An additional advantage of such a combination would be its property of shunting off stray currents, for example for grounding a telephone cable.

In general, to modify certain properties, e.g. UV-resistance, of polyolefins, it is well known in the art to add carbon black (U.S. Pat. No. 3,257,351 and German Published Application, DAS 1,226,782). However, depending on the type and quantity of the carbon black and the polyolefin, especially at higher carbon black contents, a material is obtained which is somewhat brittle (U.S. Pat. No. 3,385,817 and French Pat. No. 1,445,962). Attempts have been made to reduce the brittleness by various procedures such as by cross-linking or by irradiation, and also by the use of polypropylenes having low crystalline contents and a critical low range of density (U.S. Pat. No. 3,325,442 and 3,264,253). Although the resultant materials produced have reduced brittleness, they are not particularly marketable due to other undesirable properties.

If isotactic poly(butene-1) is processed together with a required amount of carbon black, a composition is obtained, as expected, which has a low flexibility and is highly susceptable to breakage or cracking. In German Published Applications DAS 1,145,791; DAS 1,124,239; DAS 1,104,694 and DAS 1,254,862 it is proposed, for example, to reduce the brittleness of isotactic polypropylene by the addition of non-crystalline substances. Accordingly, a mixture (adjusted to a specific insulation resistance of below 1,000 ohm-cm, for example 200 ohm-cm) consisting of isotactic poly (butene-1 ) and 24 percent by weight of conductive carbon black was changed by replacing 10, 20, 30 and 40 percent by weight of the crystalline component with respectively equivalent amounts of noncrystalline, amorphous or atactic substances such as atactic poly (butene-1), atactic polypropylene, ethylene-propylene rubber, and polyisobutylene. It was found that there was a substantial increase of the specific insulation resistance to well beyond 1,000 ohm-cm. Increasing amounts of carbon black, in turn, had the result of a renewed decrease in the previously obtained flexibility.

OBJECTS OF THE INVENTION

Accordingly, it is an object of this invention to provide an electrically conductive isotactic poly (butene-1) composition having particular use, among others, as an intermediate layer in high tension cable. It is another object of this invention to provide an electrically conductive isotactic poly (butene-1) composition having improved stress-cracking properties and improved flexing characteristics. Yet another object of this invention is to provide an electrically conductive isotactic poly (butene-1) composition which can be fused or welded to isotactic poly (butene-1). These and other objects and advantages of the invention will become apparent upon further study of the specification and appended claims.

SUMMARY OF THE INVENTION

In accordance with this invention, the above objects and others are attained by the use of compositions containing by weight, 36–50 percent, preferably between 40 and 48 percent, isotactic poly (butene-1), 23–29 percent, preferably between 23 and 27 percent of amorphous material such as ethylene-propylene rubber and polyisobutylene, and/or an atactic thermoplastic material such as atactic poly(butene-1) and atactic polypropylene, and 27–35 percent, preferably between 29 and 33 percent, of a conductive carbon black such as acetylene black and furnace black. The compositions are especially suitable for use as intermediate layers between an outer poly (butene-1) containing insulation and an inner metallic conductor of a high tension cable.

DETAILED DESCRIPTION OF THE INVENTION

The isotactic poly (butenes-1) to be used in this invention are those which are partially crystalline and exhibit $\eta_{red}$ values of 2 – 6 and densities of 9.910 – 0.930, according to standard procedure DIN 53,479 [Testing of Plastics; Determination of Density]. The $\eta_{red}$ value is the designation for reduced velocity and is calculated from the formula:

$$\eta_{red} = \frac{1}{c} \cdot \frac{\eta_L - \eta_o}{\eta_o}$$

wherein:
 $c$ = concentration ($c$=0.1 in p-xylene at 110°C.)
 $\eta_L$ = Dynamic viscosity in solution
 $\eta_o$ = dynamic viscosity of solvent The compounds are produced in accordance with the Ziegler-Natta process, using complex catalyst systems, such as, for example, the catalyst $Al(C_2H_5)_2 Cl/(3\ TiCl_3 \cdot AlCl_3)$.

The density of the atactic polymer is 0.8750 – 0.8930. Therefore the combined density of isotactic poly(butene-1) and the atactic polymer is about 9.900, in any case more than 0.890.

The density of the amorphous produces is 0.860 – 0.880 (ethylene-propylene rubber) or 0.900 – 0.920 (polyisobutylene).

In the context of this invention the term atactic polymer means a material which is built up by monomer units that contains so-called non-symmetrical carbon atoms. Such a polymer does not contain any crystallizable parts; therefore it is amorphous by reason of facts of stereo chemistry. The term amorphous means the non-crystallized polymers, too, which may contain sterically oriented units that could crystallize principally but remain amorphous by different reasons. Such amorphous materials are natural and synthetic rubbers; in our invention, ethylene-propylene rubber and polyisobutylene are useful.

Coincidental with the above polymerization procedure of the isotactic poly (butene-1), there is produced a usable atactic poly (butene-1) as an ether-soluble component of up to about 20 percent by weight. Accordingly, the atactic component need not be separated from the polymerization product because its presence is desirable in the present invention. The amount present is taken into account with respect to the amount thereof to be present in the compositions of this invention, i.e. when adding further amounts of required quantities of the atactic or amorphous phase of poly (butene-1). The $\eta_{red}$ values of the atactic component is in the range of about 0.3 and 0.9 and preferably about 0.5 and 0.7. The same considerations also apply for the atactic polypropylene material produced in the polymerization of isotactic polypropylene.

Suitable ethylene-propylene rubbers, usable in this invention, are those produced as amorphous copolymers with the use of complex catalyst systems, such as $VCl_4$, $VCl_3$ and $VOCl_3$ and aluminum alkyls, or alkyl aluminum halides, e.g. aluminum sesquichloride, at temperatures of above 0° C., and preferably between 20° and 60° C., which exhibit molecular weights of between 70,000 and 250,000, with the proportion of propylene or ethylene of between about 20–80 percent by weight.

Suitable polyisobutylenes, usable in this invention, are those which can be obtained by cationic polymerization, for example with the aid of $BF_3$ complexes as initiators, in liquid ethylene, at about −100° C. and are those having molecular weights of between 400,000 and 5,000,000.

The carbon blacks employed in this invention are those obtained by the thermal decomposition of acetylene gas (acetylene blacks) having average particle sizes, determined by an electron microscope, of 30–60, preferably 37–57 m$\mu$, having specific surface areas, calculated therefrom, of 95–53, preferably 90–56 m$^2$/g, and volatile components of no more than 1 percent of weight. Carbon blacks also usable can be the furnace blacks obtained by incomplete combustion of liquid hydrocarbons, having average particle sizes, determined by an electron microscope, of 20–29, preferably 22–28 m$\mu$, having corresponding specific surface areas of 140–85, preferably 120–89 m$^2$/g, and volatile components of no more than 2 percent, normally between 1 and 2 percent by weight. In both cases, highly structured carbon blacks are involved. The acetylene blacks have a structural index (see "Rubber Age 55", No. 5, p. 475, Aug. 1944) of around 300 and the furnace blacks have a structural index of about 130. The smaller the diameter of the carbon black particles, and the larger the specific surface, the better, generally, will be the conductivity, however, the loss in flexibility is greater of the resultant mixture. In each case, the proportion of volatile substance is of considerable importance since higher contents of volatile components can strongly impair conductivity.

Conductive thermoplastic compositions made from these components have the desired properties when the proportion of atactic and/or amorphous phase in the total mixture, having a carbon black content of about 26–35 percent by weight, is not below about 23 percent and does not exceed about 29 percent by weight. If the proportion of carbon black is greater than 35 percent by weight, or the proportion of atactic and/or amorphous material is less than 23 percent by weight, compositions will result which are too brittle for the intended usage. If the proportion of carbon black is less than 27 percent by weight, or the proportion of atactic and/or amorphous phase is greater than 29 percent by weight, the specific insulation resistance is far above 1,000 ohm-cm, and sometimes being even larger by powers of ten. Lowering the crystalline proportion of the mixture to below 36 percent by weight results in too great a loss in strength.

For stabilizing purposes, antioxidants can also be added to the compositions, such as 2,6-di-tert.-butyl-p-cresol; 2α-methylcyclohexyl-4, 6-dimethylphenol; N-stearyl-p-aminophenol, or 4,4'-thio-bis-(6-tert.-butyl-3-methylphenol), preferably together with sulfur-containing compounds, such as dilauryl thiodipropionate, in concentrations of about 0.03 – 0.5 percent by weight. Furthermore, mold lubricants, such as calcium stearate, sodium stearate, or zinc stearate, about 0.1 – 0.6 percent by weight can be added, as well as lubricants, such as graphite, about 1–5 percent by weight.

In addition, crystallization and conversion accelerators can be added for the rapid transition of modification II of the isotactic poly (butene-1). The modification II, obtained from the melt is one of the polymorphous crystallization phases of isotactic poly (butene-1), is unstable, and is transformed into the stable modification by the use of compounds such as amyl acetate, alpha-chloronaphthalene, and phenyl ether (J. Polymer Science, 62, p. 870, 1962).

Furthermore, various ester plasticizers, such as dioctyl phthalate, as known and used with poly (vinyl chloride) resins, can be added. Also, isotactic polypropylene can be added at the expense of the crystallinity of the poly (butene-1) in the mixture. Various known agents, such as aromatic, partially aromatic, and aliphatic hydrocarbons can be added to increase the viscosity of the mixture.

The preparation of the compositions is accomplished by methods known to those skilled in the art as by mixing or blending as on a mill or a roll, heated to about 120°–160° C. The partially crystalline poly (butene-1) is provided on the roll and plasticized into a sheet, while incorporating the atactic and/or amorphous material, carbon black, and other additives, such as antioxidants, lubricants, etc. However, in an especially advantageous manner, a masticator, heated to about 140°–180° C., is employed, and the mixture produced therein applied to a roll, heated to about 100°–120° C., drawn into a sheet which is cut into strips, and the strips are fed to a mill or to a granulator for comminution. The thus-produced granules can then readily be worked into conductive layers around a conductor by means of an extruder, at temperatures which are adjusted from the feeding hopper to the die to about 100°–200° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, in order to show objective comparisons, the following materials are used in each case:

Isotactic poly (butene-1), free of any atactic, ether-soluble phase and having a density, according to DIN 53,479, of 0.915, and an $\eta_{red}$ value of 4.5, corresponding approximately to an average molecular weight of 2,200,000. A critical modulus of rupture of 240 kp/cm$^2$ upon flexing as measured on standard small rods punched from 4 mm. pressed plates according to DIN 53,452 [Testing of Plastics; Bending Test], an impact resistance determination according to DIN 53,453 [Testing of Plastics; Impact Test] of "no breakage", and a brittleness temperature according to ASTM D 746 of 20° C. Atactic poly (butene-1) having the $\eta_{red}$ value of 0.6, corresponding approximately to an average molecular weight of 300,000 and a density of 0.8860.

Auxiliary stabilizing and processing agents employed in this connection, based on 100 parts by weight of total mixture, are 0.4 part by weight of 4,4'-thiobias(6-tert. -butyl-, 3-methylphenol), 0.3 part by weight of dilauryl thiodipropionate, and 0.4 part by weight of calcium stearate.

Acetylene black having an average particle size (determined by an electron microscope) of 35 m$\mu$, a specific surface area of 90 m$^2$/g, and a content of volatile components of lower than 0.6 percent. Furnace black having an average particle size of 23 m$\mu$, a specific surface area of 93 m$^2$/g, and a proportion of volatile components of 2 percent.

Polyisobutylene having a molecular weight of 4,700,000. Ethylene-propylene rubber having an average molecular weight of 100,000 with a propylene proportion of 50 percent by weight.

The testing methods employed are as follows: The specific insulation resistance, measured on 2 mm plates according to DIN 53,482/VDE 0303, Part 3; critical modulus of rupture upon flexing, according to DIN 53,452; impact resistance test, according to DIN 53,453, conducted on 3 mm plates; brittleness temperature according to ASTM D 746.

The welding factor (heat reflection butt welding) is determined from the tensile strength with reference to the weld-seamfree test bodies (=100percent) in a temperature range of 180°–240° C., with a contact pressure at the reflector of 0.5 kp/cm$^2$, and a welding pressure of 1 and 2 kp/cm$^2$.

The expression "conductor finishing mass" comprises a "-semiconductive, flexibly soft plastic compositon" which, in the context of this description can, of course, also be employed in all those cases wherein it is intended to drain off currents, i.e., for example for the grounding of a telephone cable in the form of an external cable sheathing.

EXAMPLE 1(A)

Into a 2-liter masticator (system of Werner & Pfleinderer), heated to 130° C., there are successively introduced 25 parts by weight of atactic poly (butene-1), 30 parts by weight of acetylene black, and 45 parts by weight of isotactic poly (butene-1), which latter contains the auxiliary stabilizing and processing agents. After 5 minutes of mixing time, the mixture is removed, worked into a sheet on a rolling mill heated to 120° C., and the sheet is then pressed into plates having a thickness of respectively 2, 3 and 4 mm.

Result of the tests:

| | |
|---|---|
| Specific insulation resistance | 210 Ωcm |
| Critical modulus of rupture upon flexing | 100 kp/cm$^2$ |
| Without breakage upon further flexing | |
| Impact resistance | No Breakage [No rupture] |
| Brittleness temperature | −8° C. |
| Welding factor | 0.9–1 |

The use of atactic polypropylene in place of the atactic poly (butene-1) yielded practically the same results.

COMPARATIVE EXAMPLE 1(B)

a. A mixture consisting of 25 parts by weight of atactic poly (butene-1), 37 parts by weight of acetylene black, and 38 parts by weight of isotactic poly (butene-1), is processed according to Example 1(A)

Result of the tests:

| | |
|---|---|
| Specific insulation resistance | 170 Ω cm |
| Critical modulus of rupture upon flexing | |
| With breakage upon further flexing | 150 kp/cm$^2$ |
| Impact resistance | 2 cmkp/cm$^2$ |
| Brittleness temperature | +18°C. |
| Welding factor | 0.6–0.8 |

The increase in the susceptibility to breakage [rupture] as compared to the mixture 1(A) is abundantly clear.

b. By reducing the carbon black dosage to 25 parts by weight, retaining the atactic weight proportion of mixture 1(A), and by increasing the crystalline component correspondingly to 50 parts by weight, the following test results are obtained:

| | |
|---|---|
| Specific insulation resistance | 9,000 Ωcm |
| Critical modulus of rupture upon flexing | 80 kp/cm$^2$ |
| Without breakage upon further flexing | |
| Impact resistance | No breakage |
| Brittleness temperature | −12° C. |
| Welding factor | 0.9–1 |

Although, in this case, the mechanical array of properties corresponds to the requirements to be met by a conductor finishing mass, the specific insulation resistance is too high by more than one power of ten.

COMPARATIVE EXAMPLE 1(C)

a. Into the Werner & Pfleiderer masticator, there are introduced 20 parts by weight of atactic poly (butene-1), 30 parts by weight of acetylene black, and 50 parts by weight of isotactic poly (butene-1), and the mixture is process as described in Example 1(A).

The test bodies produced from the pressed plates exhibit the following values:

| | |
|---|---|
| Specific insulation resistance | 180 Ω cm |
| Critical modulus of rupture upon flexing | 140 kp/cm$^2$ |
| With breakage upon further flexing | |
| Impact resistance | 1.5 cmkp/cm$^2$ |
| Brittleness temperature | +10° C. |
| Welding factor | 0.9–1 | b. Test bodies containing, in addition to 30 parts by weight of acetylene black, 30 parts by weight of atactic poly (butene-1) and 40 parts by weight of isotactic poly (butene-1), yield the following test results:

| | |
|---|---|
| Specific insulation resistance | 1,500 Ω cm |
| Critical modulus of rupture upon flexing | 90 kp/cm$^2$ |
| Without breakage upon further flexing | |
| Impact resistance | No breakage |
| Brittleness temperature | −12° C. |
| Welding factor | 0.9–1 |

Comparative Examples 1(C) (a) and 1(C)(b) demonstrate the great influence exerted by the atactic material on the electrical as well as mechanical properties, and how narrow the range is within which satisfactory compositions are obtained for conductor finishing or cable sheathing.

EXAMPLE 2

The atactic poly (butene-1) in Example 1(A) is substituted in one case with polyisobutylene and, in another case with ethylene-propylene rubber; otherwise, the same conditions are employed as described in that example.

The following property test data are obtained,

In the case of polyisobutylene:

| | |
|---|---|
| Specific insulation resistance | 180 Ω cm |
| Critical modulus of rupture upon flexing | 70 kp/cm$^2$ |
| Without breakage upon further flexing | |
| Impact resistance | No breakage |
| Brittleness temperature | −15° C. |
| Welding factor | 0.9–1 |

In the case of ethylene-propylene rubber:

| | |
|---|---|
| Specific insulation resistance | 170 Ωcm |
| Critical modulus of rupture upon flexing | 80 kp/cm$^2$ |
| Without breakage upon further flexing | |
| Impact resistance | No breakage |
| Brittleness temperature | −25° C. |
| Welding factor | 0.9–1 |

EXAMPLE 3

In place of acetylene black in Example 1(A), an equal amount of furnace black is substituted for the acetylene black, and in place of the atactic poly (butene-1), an equal amount of polyisobutylene is substituted.

The test data are as follows:

| | |
|---|---|
| Specific insulation resistance | 150 Ωcm |
| Critical modulus of rupture upon flexing | 50 kp/cm$^2$ |
| Without breakage upon further flexing | |
| Impact resistance | No breakage |
| Brittleness temperature | −32° C. |
| Welding factor | 0.9–1 |

EXAMPLE 4

Several hundred meters of line for the construction of a triple-core [three-wire] 30 kilovolt cable are produced, under the processing conditions set out below, and with the use of a tandem extrusion system, comprising:

a. a 60-Troester Extruder with a short compression screw (20 D, compression ratio 1 : 3.5) and a pressure spray nozzle, at right angles to the extrusion axis, for the purpose of applying the conductor finishing (composition according to Example 1(A) to the metallic cores [wires]; and b. a 150 - Troester Extruder with a short compression screw having the same compression ratio as above and with a pressure spray nozzle, inclined by 60° with respect to the extrusion axis, for sheathing with the insulating layer of isotactic poly (butene-1) of the specification as set forth in 1(A).

In regard to (a) - Conductor Finishing:

| | |
|---|---|
| Temperature control: (from the feeding hopper to the die) | 140/185/170/170/180° C. |
| Temperature of the mass: | about 180° C. |
| Current absorption: | 24 amperes |
| Speed of rotation of the screw | 23 r.p.m. |

Under these conditions, a layer thickness of 1 mm of the conductor finish is obtained.

In regard to (b) - Core Insulation:

| | |
|---|---|
| Temperature control: (from the feeding hopper to the die) | 155/155/165/150/156° C. |
| Temperature of the mass: | about 205° C. |
| Current absorption: | 160 amperes |
| Speed of rotation of the screw: | 25 r.p.m. |
| Draw-off speed: | 3.2 m/min |
| Water bath (length about 30 m) | Temperature 40°C. at inlet, 20°C. at outlet. |

The thickness of the core insulation is 18 mm.

The expected result of an extremely extensive uniformity, i.e., independence of the loss angle δ from voltage and time, is confirmed by loss factor measurements according to DIN 53,483/VDE 0303, Part 4, with voltages of between 8 and 46 kilovolts applied between the internal conductor and the external conductor to the finished cable, as well as more than 270 hours at 500 cycles and 10 kilovolts after storing the test specimen lengths for 14 hours at room temperature (the last-mentioned test, being a "fast-motion" method, is to be evaluated so that the finding determined at 500 cycles and 270 hours corresponds to the finding at 50 cycles and 2,700 hours).

By substituting in Example 1(A), the acetylene black by the furnace black of Example 3, a mixture consisting of 38 percent by weight of isotactic poly (butene-1) 28 percent by weight of atactic poly (butene-1), and 34 percent by weight of furnace black yields comparable results. The same holds true for Example 2, when substituting instead of 25 parts by weight of ethylene-propylene rubber, 45 parts by weight of isotactic poly(butene-1) and 30 parts by weight of acetylene black, in this case 23 parts by weight of ethylene-propylene rubber, 49 parts by weight of isotactic poly (butene-1), and 28 parts by weight of furnace black.

Finally, in Example 3, when the polyisobutylene is substituted with an equal mixture of an ethylene-propylene rubber having a molecular weight of 120,000 with a proportion of 40 percent by weight of propylene, and atactic poly (butene-1), values comparable to Example 3 are likewise obtained. Also, when substituting polyisobutylenes having molecular weights of 2,700,000 and 1,300,000, respectively, in place of polyisobutylene having the molecular weight of 4,700,000 in Example 3, no appreciable difference in results is obtained. If the partially crystalline poly (butene-1) of these examples is substituted with a higher-or lower-molecular weight poly (butene-1), for example, ones having reduced viscosities of 3.0 and 5.5, respectively, again no appreciable difference in results is obtained.

The preceding examples can be repeated with similar success by substituting the generically or specifically described reactants and/or operating procedures of this invention for those used in the preceding examples.

The conductive thermoplastic compositions of this invention can be used in the production of high tension cables wherein the conducting layer is intermediate an outer insulating sheathing or layer of poly (butene-1) and an inner conductor. As previously stated herein, the advantages obtained are the prevention of voltage peaks and glow discharges on the boundary surfaces. Their weldability and compatibility with the outer layer of poly (butene-1) produces a cable which has excellent high stress-cracking resistance and long life. Although the compositions have particular use in the production of high tension cables, they can have various uses, where it is desired to have a conducting thermoplastic composition in electrical applications.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an electric cable comprising an inner conductor core and an electrically conductive layer surrounding said core, the improvement wherein said electrically conductive surrounding layer comprises in parts by weight, 36–50 percent isotactic poly (butene-1), 23–29 percent of a thermoplastic material selected from the group consisting of amorphous and atactic resins and mixtures thereof, and 27–35 percent of a conductive carbon black, said surrounding layer having a specific insulation resistance less than 1,000 ohm-cm.

2. The electric cable of claim 1 wherein said thermoplastic material is atactic poly (butene-1).

3. The electric cable of claim 1 wherein said thermoplastic material is atactic polypropylene.

4. The electric cable of claim 1 wherein said thermoplastic material is ethylene-propylene rubber.

5. The electric cable of claim 1 wherein said thermoplastic material is polyisobutylene.

6. The electric cable of claim 1 wherein said carbon black is acetylene black.

7. The electric cable of claim 1 wherein said carbon black is furnace black.

8. The electric cable of claim 1 wherein the conductive carbon black is an acetylene black having an average particle size of 30–60 m$\mu$, a specific surface area of 95–53 m$^2$/g and is not more than 1 percent by weight of volatile components, or a furnace black having an average particle size of 20–29 m$\mu$, a specific surface area of 140–85 m$^2$/g, and not more than 2 percent by weight of volatile components.

9. The electric cable of claim 1 wherein said layer surrounding said core comprises 40–48 percent of isotactic poly(butene-1), 23–27 percent of said thermoplastic material, and 29–33 percent of said carbon black.

10. An electric cable as defined by claim 1, further comprising a second and outer layer enveloping said surrounding layer, said second outer layer comprising partially crystalline poly(butene-1).

11. An electric cable as defined by claim 8, further comprising a second and outer layer enveloping said surrounding layer, said second outer layer comprising partially crystalline poly(butene-1).

* * * * *